United States Patent [19]

Dannenmann

[11] Patent Number: 5,666,453

[45] Date of Patent: Sep. 9, 1997

[54] FIBER OPTIC JUMPER CABLES AND TRACING METHOD USING SAME

[75] Inventor: John E. Dannenmann, Portland, Oreg.

[73] Assignee: Roy Witte, Inverness, Ill.

[21] Appl. No.: 275,973

[22] Filed: Jul. 15, 1994

[51] Int. Cl.$^6$ ............................................. G02B 6/44
[52] U.S. Cl. ...................... 385/101; 385/39; 385/55; 385/73; 385/76; 385/100; 385/88; 385/89; 385/139
[58] Field of Search ......................... 385/31, 39, 55, 385/56, 60, 66, 72, 73, 76, 77, 78, 70, 88, 89, 92, 139, 101, 100, 16

[56] References Cited

U.S. PATENT DOCUMENTS

| | | | |
|---|---|---|---|
| 3,706,134 | 12/1972 | Sweeney et al. | 385/147 X |
| 3,942,859 | 3/1976 | Korodi | 339/113 |
| 4,549,783 | 10/1985 | Schmachtenberg, III | 385/92 X |
| 4,653,848 | 3/1987 | Kloots | 385/76 X |
| 4,707,073 | 11/1987 | Kocher | 385/902 X |
| 4,715,671 | 12/1987 | Miesak | 385/147 X |
| 4,775,212 | 10/1988 | Smith | 385/100 X |
| 4,887,190 | 12/1989 | Sadamune et al. | 385/901 X |
| 4,902,092 | 2/1990 | Grandy | 385/60 X |
| 4,978,194 | 12/1990 | Allen et al. | 385/76 X |
| 5,066,097 | 11/1991 | Brandle et al. | 385/76 |
| 5,222,164 | 6/1993 | Bass, Sr. et al. | 385/14 |
| 5,228,109 | 7/1993 | Fujii et al. | 385/76 X |
| 5,265,187 | 11/1993 | Morin et al. | 385/135 |
| 5,305,405 | 4/1994 | Emmons et al. | 385/73 |
| 5,353,367 | 10/1994 | Czosnowski et al. | 385/135 |

OTHER PUBLICATIONS

"Lightracer Fiber Optic Patchcord" flyer of ADC Telecommunications (2 pp.), Apr., 1994 Revision ©1993, 1994.

*Primary Examiner*—Brian Healy
*Attorney, Agent, or Firm*—Noel I. Smith

[57] ABSTRACT

This specialized fiber optic jumper cable includes a composite cable with a glass fiber light guide for single or multi transmission mode, standard fiber optic connectors, electrically powered light emitting devices at the fiber optic connectors, and a pair of electrical conductors embedded in the cable, with one or more electrical power connectors for selectively applying an external electrical power source to the light emitting devices. One embodiment has a fiber optic connector at each end of the jumper. An LED and an electric power connector suitable for plug-in connection of a power pack are affixed to the cable adjacent each end such that both LEDs are lighted whenever power is applied to either of the electrical connectors. The attendant illumination of the LEDs provides an indication that the tracer system is activated and functioning properly and readily indicates where both ends of the same jumper cable are located. The electrical conductors also may be used for convenient telephonic communication by service personnel. A further pair of electrical conductors may be provided in the cable for auxiliary uses, if desired.

28 Claims, 4 Drawing Sheets

FIBER OPTIC JUMPER CABLES AND TRACING METHOD USING SAME

FIELD OF THE INVENTION

This invention relates to fiber optic jumper cables and particularly to the provision of integrated means for readily tracing remote connective portions of the same fiber optic cable.

BACKGROUND OF THE INVENTION

Fiber optic jumper cables, frequently referred to as "jumpers" or "patchcords", typically have single strand optical fibers incased in flexible cables and are designed to interconnect two other fiber optic devices or cables within a fiber optic transmission system. Such jumper cables often are used in systems where there are many jumper cables connected to frames or panels, each of which may have many connecting cables and which may be located closely adjacent other similar panels, sometimes without carefully regimented management of the cables. The connections of each cable may be remote from one another, even being in separate rooms or spaces, whereby the jumpers may be of substantial length.

One example of such use of fiber optic jumpers is in communication centers where often it is necessary to connect an individual optical fiber in a first fiber optic cable at one location with an individual fiber in a second fiber optic cable at another location remote from the first. Further the interconnections sometimes are located in crowded and/or cramped quarters. In any event, tracing and identifying a remote connector section or end of a specific cable for changing its connection in a network or to facilitate replacement often is difficult, tedious and time consuming, and can lead to errors which create further service problems and additional costs. Accordingly, there is a need for an improved mode of readily tracing fiber optic cables to easily and accurately identify a remote portion, and particularly to identify a remote terminal end.

It is an object of this invention to meet the aforenoted traceability needs.

More particularly, it is an object of this invention to provide improved fiber optic cables which include means for readily identifying a connector portion which is remote from a first identifiable portion of that same cable, e.g. remote from one connected end thereof.

Further, it is desirable that such tracing capability be independent of the fiber optic connectorization system whereby the improved tracing feature may be implemented in jumper cables with fiber optic connectors of various designs and sources.

It is another object of this invention to provide improved fiber optic jumper cables with integrated tracing means which are independent of the particular fiber optic transmission system employed in the cable.

It is another object of this invention to provide an embodiment in which such improved tracing systems are independent of the fiber optic connectors used on the jumper cables.

It is a further object of this invention to provide a jumper cable system which meets the aforementioned traceability needs and also facilitates service communications.

It is another object of this invention to provide such fiber optic jumper cables with flexibility for ease of performing other service related functions.

SUMMARY OF THE INVENTION

An electrically activated visual telltale signal device is provided adjacent at least one of the fiber optic connections which are spaced from one another along a fiber optic jumper cable. An electric power control such as an electrical power connector or switch is provided at another of the fiber optic connections. Electrical conductors extend between the power control and the telltale signal device, whereby the signal device may be activated electrically to identify the respective portion of the cable at the first connection position.

A presently preferred embodiment is a jumper cable which includes a composite cable with a glass fiber light guide (single or multi mode), standard fiber optic connectors and electrically powered light emitting devices at each end of the cable, and a pair of electrical conductors extending along the cable, with one or more electrical power connectors for selectively applying an external electrical power source to the light emitting devices through the conductors. More specifically, one embodiment has an LED and an electric power connector suitable for plug-in connection of a power pack affixed to the cable adjacent each end. A pair of metallic electrical conductors are embedded in the cable and interconnect the electrical connectors and the LEDs such that both LEDs are lighted whenever power is applied to either of the electrical connectors. The attendant illumination of the LEDs provides an indication that the tracer system is activated and functioning properly and readily indicates where both ends of the same jumper cable are located. In a further preferred embodiment, the power packs provide for telephonic communication through the electrical conductors.

A further pair of electrical conductors may be provided in the cable for auxiliary uses, if desired.

While the invention will be further described in connection with certain preferred embodiments, it is not intended to limit the invention to those embodiments. On the contrary, it is intended to cover all alternatives, modifications and equivalents as may be included within the spirit and scope of the invention.

DETAILED DESCRIPTION OF PREFERRED EMBODIMENTS

FIGS. 1–4 illustrate a fiber optic jumper cable 10 which includes a composite cable 12 with a fiber optic connector 14 at each end and an electrically operated telltale device 16 adjacent each of the connectors 14. The illustrated cable 12 includes a single glass fiber light guide 20 surrounded by a buffer layer 22, an intermediate strength layer 24 within which is embedded a pair of insulated electrical wires 26, and an outer cover jacket layer 28.

Figure 1:
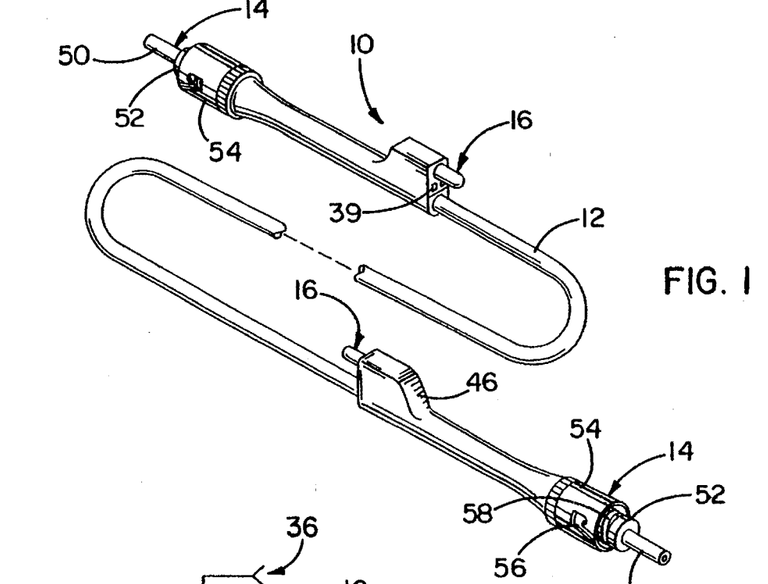
FIG. 1 is a somewhat schematic illustration of a fiber optic jumper cable employing teachings of this invention.
Figure 1A:
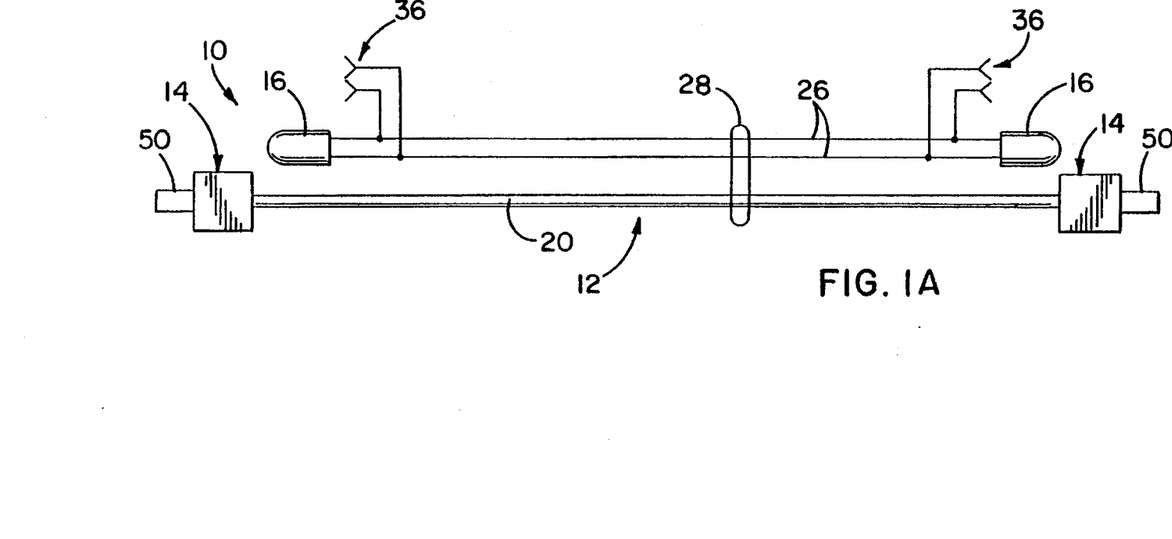
FIG. 1A is a schematic illustration of a jumper cable as in FIG. 1.

The glass fiber light guide 20 of course includes at least a core and a cladding having different indices of refraction, and at least one of those components may be formed of plastic as well as of glass, as is known in the art. Also, there may be one or more additional covering coatings or layers for enhancement and/or protection of the light guide and its light transmissive as well as physical properties such as strength and bending qualities. Accordingly, the term "glass fiber" is used in this description and in the appended claims to encompass all such variations of light guides. Further, the glass fiber and various coating and covering components and variations thereof to form a basic jumper cable are known in the optical fiber art and will not be further described herein.

Figure 2:
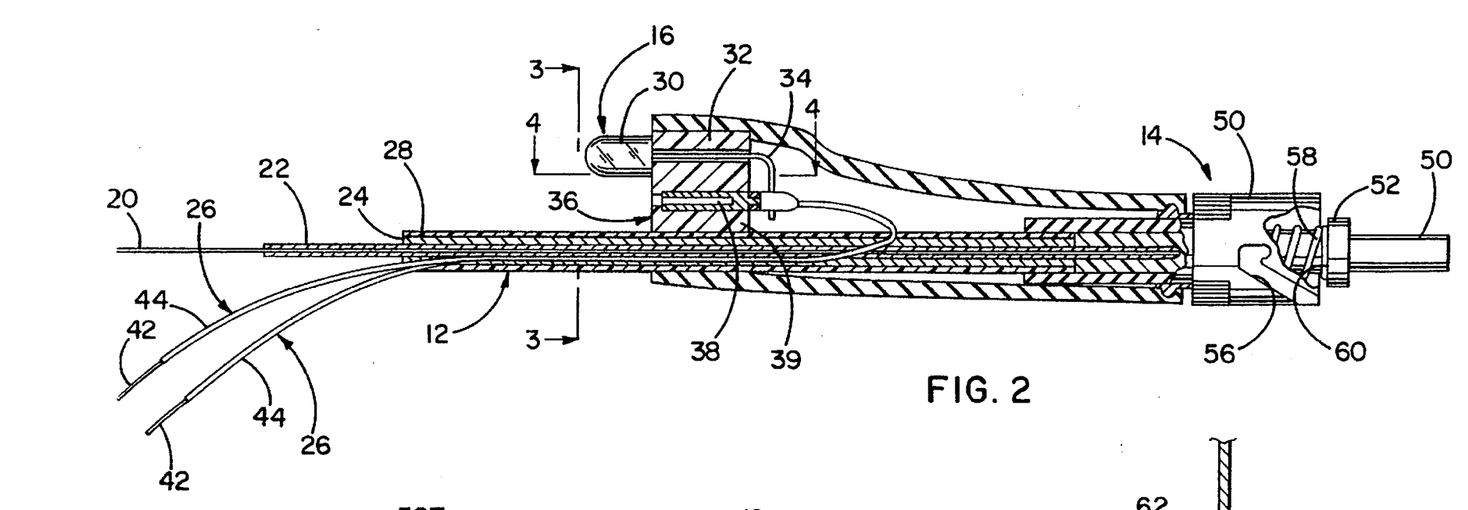
FIG. 2 is an enlarged side view, partially in section, of one end portion of the cable of FIG. 1, schematically illustrating the respective fiber optic connector, a visual telltale device, an electrical power connector and the connecting electrical power conductors for operating the telltales.
Figure 3:
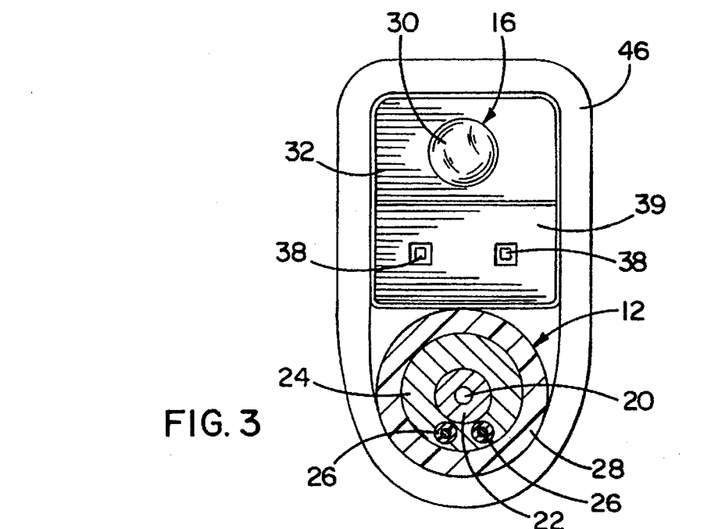
FIG. 3 is an enlarged view, partially in section, taken generally along line 3—3 of FIG. 2.

The illustrated telltale 16 is a light emitting diode (LED) 30 mounted in a support block 32, with power lead tails 34 protruding from the opposite side of the block. A power connector 36 also is provided immediately adjacent the LED and includes a pair of female contacts 38 disposed in a receptacle or socket 39 for receiving appropriate plug prongs of a power source such as the battery pack unit 40 shown in FIG. 6 or the converter pack 80 shown in FIG. 7.

Figure 4:
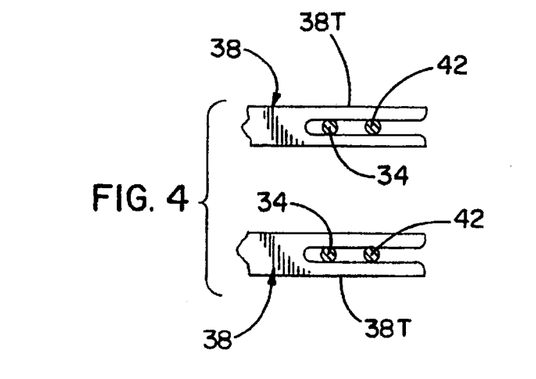
FIG. 4 is a partial enlarged view taken generally along the line 4—4 of FIG. 2 and illustrating an electrical interconnection of the electrical conductors.

Each of the electrical wires 26 is a small metallic electrical conductor 42, e.g., 28 gauge stranded copper, covered by a suitable insulation sheath 44. The wires 2 are embedded in the cable 12, such as within the strength layer 24, preferably throughout its length at the time of manufacture of the cable. The conductors 42 are connected to the power connector 36 and to the telltales 16 such that upon applying electrical power through the conductors 42, the telltales 16 are activated. For example, as shown in FIG. 2, the outer jacket 28 of the cable 12 is slit adjacent the respective end to expose and extract portions of the wires 26. Exposed end portions of the respective conductors 42 and the ends of the respective tails 34 are physically and electrically connected to the contacts 38 in any appropriate manner, for instance by being crimped in end portions 38T of the contacts in a known manner as illustrated in FIG. 4 or by other solderless termination techniques or by soldering. A flexible electrically insulative boot 46 surrounds the exposed ends of the wires 26 and the electrical interconnection with the telltale components 16 and the power receptacle 39 to retain these components in assembled relation on the cable 12 as well as to provide electrical insulation protection for the interconnections.

Figure 5:
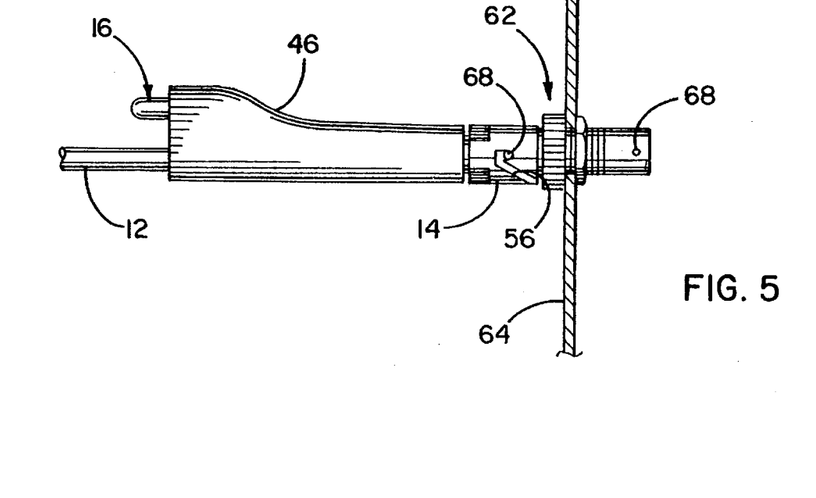
FIG. 5 is a partial side view illustrating one end of the jumper cable of FIG. 1 mated with a bulkhead coupler.

The fiber optic connectors are located on the ends of the length of the cable 12 and may be of any suitable design, such as so-called ST, FC, D4 or SC type connectors. The illustrated connectors 14 are of the ST type, each comprising a ceramic connector tube 50 which is fixed in a housing 52. A latch sleeve 54 surrounds the housing 52 and includes a J-shaped slot 56 for engaging a pin 68 of a mating device to effect a bayonet coupling affixation to such mating device. A coil compression spring 58 also surrounds the housing 52 within the sleeve 54, being confined between an abutment shoulder 60 on the housing 52 and an opposing inner annular shoulder (not shown) on the sleeve 54. The sleeve is reciprocable along the housing 52 against the compressive force of the spring 58, and also is rotatable on the housing to effect bayonet latching engagement with any complementary mating connector device. By effecting such engagement with the spring compressed, the distal end of the ceramic tube 50 and an optic fiber therein are maintained in resilient firm abutment contact with a mating end of a glass fiber and its holder in the other fiber optic device, in a known manner. FIG. 5 illustrates such a mating connection with a fiber optic connector 62 which is affixed to a bulkhead or distribution panel 64. The right end of the connector 62, as seen in FIG. 5, illustrates a typical connector end for mating with a connector 14 and having a pin 68 for engaging in a slot 56 for retention purposes.

Figures 6, 7, 8:
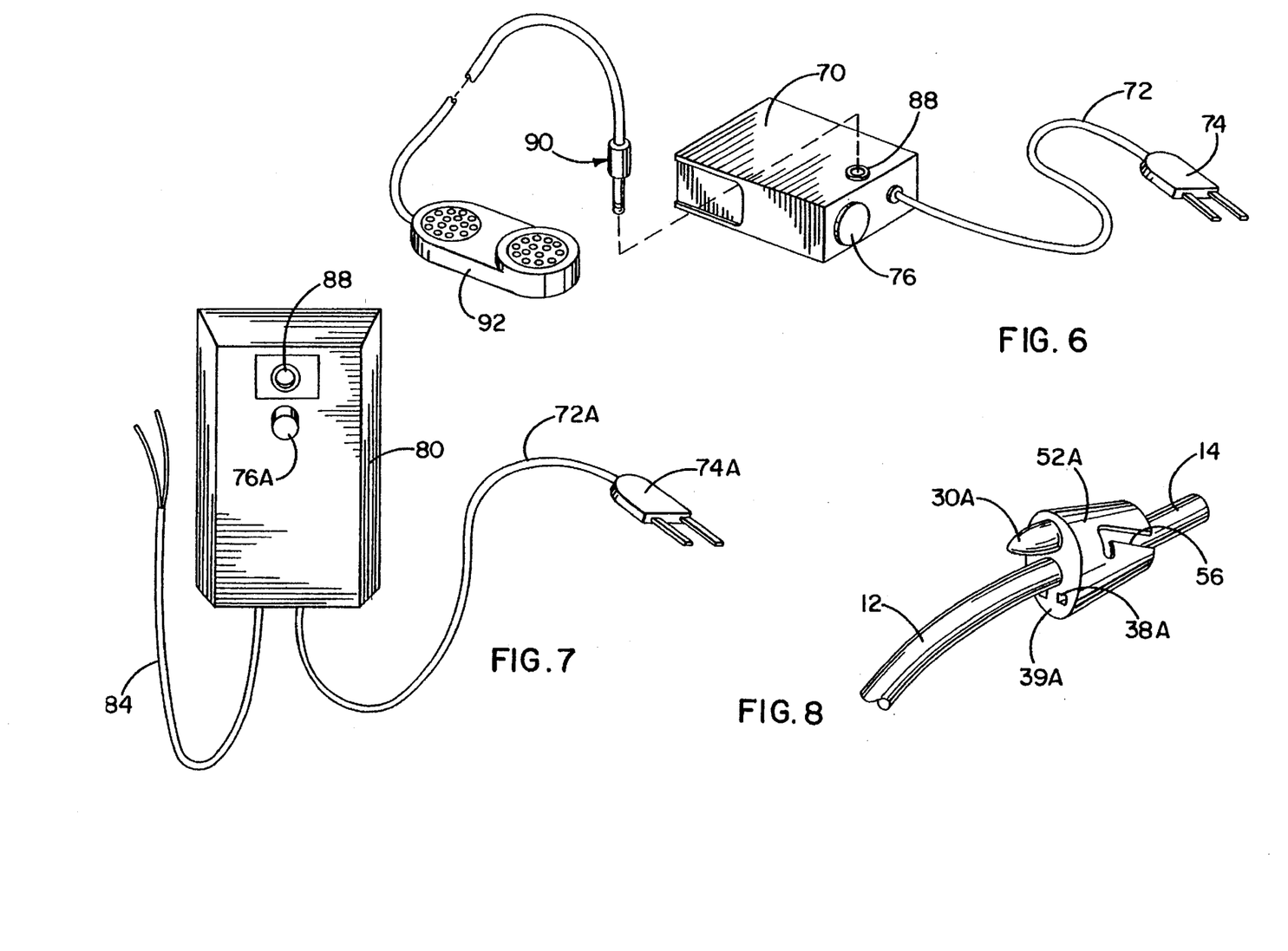
FIG. 6 is a partially schematic illustration of a portable battery power source for activating the telltales of the device of FIG. 1, and illustrating the inclusion of a lineman's handset for communication over the electrical power conductors which operate the telltales.
FIG. 7 illustrates a fixed electrical power supply and control switch.
FIG. 8 schematically illustrates an embodiment wherein the telltale and an electrical power connector are accommodated in the fiber optic connector.
Figure 9:
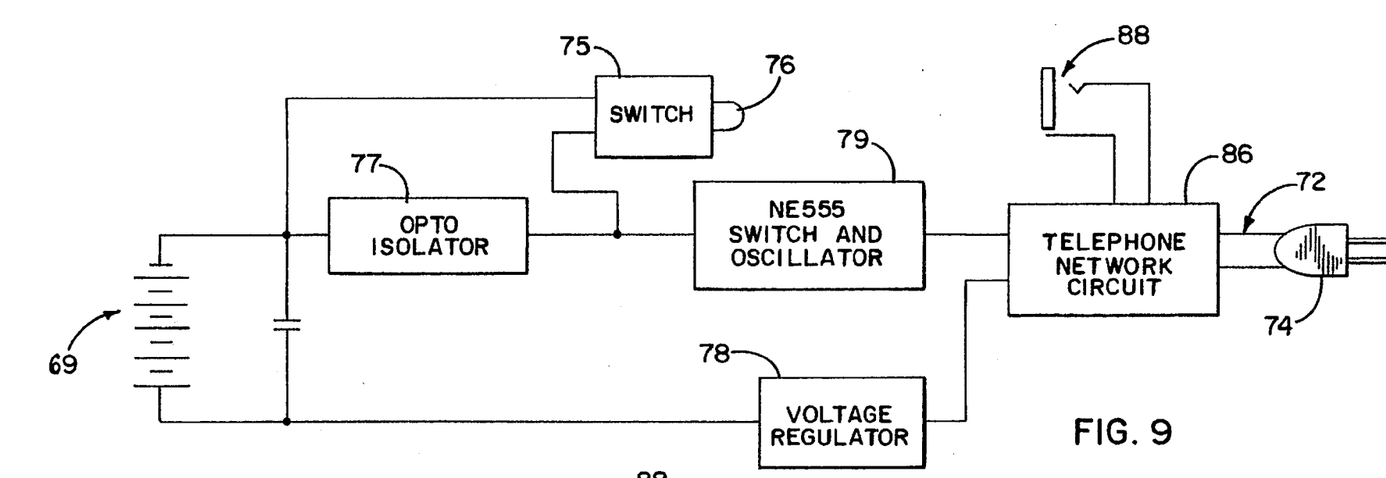
FIGS. 9 and 10 are diagrams of illustrative electrical power and control circuits for the power supplies of FIGS. 6 and 7, respectively.

Referring to FIGS. 6 and 9, a battery pack 40 includes a drycell battery 69, e.g., 9 volts, in a housing 70. The battery is suitably connected to a pair of external leads in a short, e.g. 2', flexible cable 72 which carries a power plug connector 74 that is mateable with the contacts 38 of the receptacle 39. The pack 40 may include an appropriate control switch and latch circuit such that it will be activated by pressing a control button 76 and then remain activated until the power plug 74 is disconnected from the jumper cable indicator circuit. Referring to FIG. 9 for example, the button 76 closes a momentary switch 75 to activate the telltale circuit. An opto oscillator 77 includes an internal current LED and a photo sensitive transistor which responds to the lighted internal LED to maintain the circuit in an "on" condition despite the opening of switch 75 upon release of the button 76. Disconnecting the plug turns off the circuit so that no power is drained in the idle state.

The pack 70 preferably includes a voltage regulator 78 and an NE555 switch and oscillator 79 for DC-to-AC conversion, with an AC output greater than about 2 volts and normally about 4 volts to operate the LEDs. One such unit includes an oscillator converter of about 1000 Hz. Provision of AC power to the telltale circuit insures activation of telltale LEDs 30 regardless of the orientation of plug 74 relative to the telltale circuit and thereby avoids any need to assure particular polarization for mating the power plug 74 to the receptacle 39.

Figure 10:
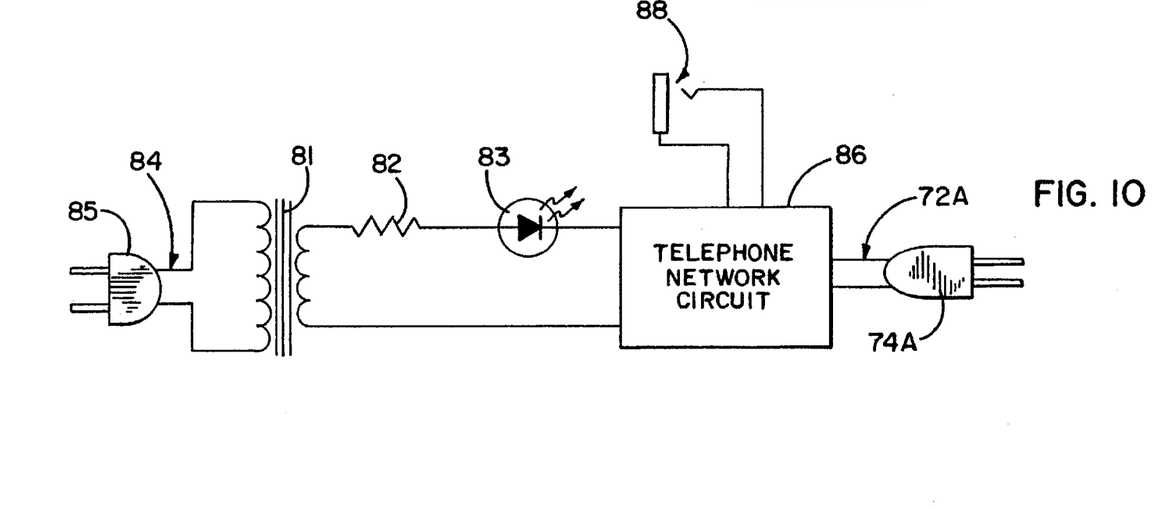

In another arrangement, a power supply may be provided which operates from a conventional AC power circuit. Referring for example to FIGS. 7 and 10, a power converter pack 80 includes an appropriate electrical transformer 81 with a voltage control resistor 82, such as for converting a 120 volt input to a 4 volt output. A safety element such as an internal LED or lamp 83 preferably is provided to protect the transformer in the event of a short-circuit. An AC power input lead 84 is connected to the high voltage side of the transformer and to a conventional available electrical power circuit, as by hard wiring or by a conventional plug 85. A flexible cable lead 72A is connected to the operating low voltage output of the pack 80 and includes a power plug 74A at its distal end for mating with any receptacle 39 of the jumper cable system. The power package 80 may be mounted near a fiber optic panel, with an appropriate length of the cable 72A to reach any desired receptacle 39 of multiple fiber optic cables at that site. The pack 80 also may include an appropriate control switch in the output circuit operated to "on" an "off" modes by a control button 76A, or a momentary switch and an opto isolator as in FIG. 10. Thereby power may be applied to the cable 72A selectively for selectively activating an indicator circuit to which the pack 80 is connected as by a plug 74A or by another readily detachable mode or by a more permanent connection mode.

Whether powered by an internal battery or using external power, the power pack preferably is portable for movement from work station to work station, and may be hand held or temporarily mounted adjacent a frame or panel such as by a clip or Velcro® securement. However, the power pack also may be a fixed installation, such as for panels and racks which serve a large number of fiber optic jumper cables. The leads 72, 72A may be fixed to the power pack or may be patchcords, particularly in installations which include a fixed power pack, and may be free cords or may be mounted on automatic take-up reels or other forms of automatic returns.

Upon applying electrical power to the wires 26, as by the simple act of plugging in the battery power pack 40 or the power package 80 to a receptacle 39 and pushing the activating switch or button 76, 76A, the LED telltales will be lighted. For example, a user who has identified one connector end of a fiber optic jumper cable to be traced may plug the power pack into the conveniently adjacent power connector 39. The attendant illumination of the adjacent LED will signal that the telltale tracer system is operating. The user then seeks a correspondingly illuminated and hence readily visible telltale at another location to readily locate and identify the other terminal end.

The telltale devices may be provided at any locations along the fiber optic cable as desired, e.g., at terminal end connectors and at other significant desirable identification points along the fiber optic cable simply by adding another telltale device at each such point and connecting it to the electrical conductors of the composite cable.

It will be appreciated that various telltale devices may be utilized, including for example conventional small light bulbs or liquid crystal or electro-mechanical indicators suitably mounted in the desired positions along the cable 12, wherever ease of identification is desired. For example, a light bulb or liquid crystal visual indicator may be substituted for each LED in a system as described with reference to FIGS. 1-5. One example of an electro-mechanical device such as may be used is a "Frantie Indicator", which has a movable disk that exposes either a flat black surface or a bright contrasting surface to the viewer as the device is subjected to successive electro-magnetic pulses. The use of LEDs presently is preferred for simplicity and ruggedness.

Providing telltales and power connections separate from the fiber optic connectors permits use of the system in jumper cables using any type of fiber optic connectorization. However, the telltale devices and the provisions for electrical power connection may be integrated into the fiber optic connector structures, e.g., wherever this approach proves cost effective. Also, the relative positions and orientation of the telltale and the power connector may be varied. One connector/telltale device which illustrates such variations is shown in FIG. 8. Here the connector housing 52A is molded or cast of a configuration to accommodate an indicator lamp 30A and a power connector receptacle 39A with contacts 38A as well as the fiber optic connection components. This approach may result in increased size as well as complexity of the fiber optic connector and also forego some of the flexibility attendant upon the use of independent components as in the preferred designs. However, the approach of unifying the electrical indicator and power connector with the fiber optic connector may prove beneficial in some embodiments. It also will be noted that in the embodiment of FIG. 8 the telltale and electrical power connector components are disposed generally symmetrically about the cable 12.

The use of a portable plug-in battery pack provides a simple, flexible and cost-effective approach to powering and selectively activating the telltales. For example, the pack 70 of FIG. 6 may be clipped to a service person's belt for convenient use at any location. However, in some installations power may be supplied from fixed outlets associated with the cross connect system hardware which uses the jumper cables, with voltage and current control provisions suitable to the electrical conductors and telltale devices being utilized. Electrical switches then may be provided at convenient locations, in lieu of the power connectors 36, for activating one or more of the telltales along a cable. An "alert" signal means, such as a sound emitting device, may be added at some or all indicator positions for activation by the same internal electrical signal power system simultaneously with activation of the visual indicators. This will serve to alert a worker to look for an activated visual telltale.

As indicated in FIGS. 6 and 9, the internal electrical conductors 42 also may serve for telephonic communication, such as between service personnel at positions remote from one another, in the manner of so-called "order wires" heretofore provided in wiring cables in telephone communications systems. To this purpose, telephone network circuits also are provided, as at 86 in FIGS. 9 and 10, for interconnection to the electrical conductors 42. Service personnel at opposite ends of the jumper cable then also may communicate with one another telephonically over the conductors 42, such as by attachment of communication units at their respective positions. Appropriate telephone jack sockets 88 in the circuit 86 may be provided at the respective positions, such as in association with the power connectors 36 or preferably in the power packs 70,80, to receive the jacks 90 of lineman's handsets 92.

Another pair of wires 26 may be embedded in each cable 12 for other auxiliary purposes. Maintenance of small size and minimal unit costs are highly desirable.

It will be appreciated that improvements have been provided in fiber optic jumper cables which meet the noted problems and satisfy the noted objects.

The invention has been described in considerable detail with reference to certain embodiments, and particularly with respect to the currently preferred embodiments thereof. However, it will be understood that variations, modifications and improvements may be made, particularly by those skilled in this art and in light of the teachings referred to herein within the spirit and scope of the invention as claimed.

What is claimed is:

1. A fiber optic jumper cable which includes at least one fiber optic light guide for conducting a light signal through said cable, a plurality of fiber optic connections spaced from one another along said cable for effecting light-signal transmissive interconnections between said light guide and other optic devices, an electrically activated telltale affixed to said cable at a first position adjacent at least one of said fiber optic connections for providing an identification signal when activated, an electric power control at a second position spaced from said first position, and said cable further including an electrical conductor extending between and operatively connected to at least said power control and said telltale device, whereby said telltale device may be activated by manipulation of said power control at said second position for identification of said cable at said first position by the identification signal provided by said telltale device thereat.

2. The invention as in claim 1 wherein said telltale provides a visible signal when activated.

3. The invention as in claim 2 wherein said telltale is a light emitting device.

4. The invention as in claim 1 wherein said telltale is a light emitting diode.

5. A fiber optic jumper cable which includes at least one fiber optic light guide for conducting a light signal through said cable, a plurality of fiber optic connections spaced from one another along said cable for effecting light-signal transmissive interconnections between said light guide and other optic devices, an electrically activated telltale affixed to said cable at a first position adjacent at least one of said fiber optic connections for providing an identification signal when activated, an electric power control at a second position spaced from said first position, and said cable further including an electrical conductor extending between and operatively connected to at least said power control and said telltale device, whereby said telltale device may be activated by manipulation of said power control at said second position for identification of said cable at said first position by the identification signal provided by said telltale device thereat, wherein said telltale is an electro-mechanical device for generating a visible signal when activated.

6. A fiber optic jumper cable which includes at least one fiber optic light guide for conducting a light signal through said cable, a plurality of fiber optic connections spaced from one another along said cable for effecting light-signal transmissive interconnections between said light guide and other optic devices, an electrically activated telltale affixed to said cable at a first position adjacent at least one of said fiber optic connections for providing an identification signal when activated, an electric power control at a second position spaced from said first position, and said cable further including an electrical conductor extending between and operatively connected to at least said power control and said telltale device, whereby said telltale device may be activated by manipulation of said power control at said second position for identification of said cable at said first position by the identification signal provided by said telltale device thereat, wherein said power control is affixed to said cable adjacent at least one other of said fiber optic connections.

7. The invention as in claim 1 wherein said electric power control is an electric power connector.

8. The combination of a fiber optic jumper cable which includes at least one fiber optic light guide for conducting a light signal through said cable, a plurality of fiber optic connections spaced from one another along said cable for effecting light-signal transmissive interconnections between said light guide and other optic devices, an electrically activated telltale affixed to said cable at a first position adjacent at least one of said fiber optic connections for providing an identification signal when activated, an electric power control affixed to said cable at a second position spaced from said first position, and said cable further including an electrical conductor extending between and operatively connected to at least said power control and said telltale device, whereby said telltale device may be activated by manipulation of said power control at said second position for identification of said cable at said first position by the identification signal provided by said telltale device thereat, wherein said electric power control is an electric power connector, and an electric power pack having a mating connector compatible with said electric power connector.

9. The invention as in claim 8 wherein said power pack includes means for connecting a telephone to said electrical conductor for effecting telephonic communications along said conductor.

10. The invention as in claim 9 in combination with a telephone unit selectively connectable to said electrical conductor through said means.

11. The invention as in claim 1 wherein said electric power control is a switch.

12. The invention as in claim 1 wherein each of said fiber optic connections is a fiber optic connector.

13. The invention as in claim 12 wherein said fiber optic connectors include one of said connectors on each end of said cable.

14. The invention as in claim 1 wherein said electrical conductor is embedded in said cable.

15. The invention as in claim 1 wherein said electrical conductor includes a first pair of conductors embedded in said cable.

16. The invention as in claim 15 including a second pair of conductors substantially coextensive with said first pair and also embedded in said cable.

17. The invention as in claim 1 and including means for connecting telephones to said electrical conductor.

18. A fiber optic jumper cable which includes at least one fiber optic light guide for conducting a light signal through said cable, a plurality of fiber optic connectors spaced from one another along said cable for effecting light-signal transmissive interconnections between said light guide and other optic devices, an electrically activatable visual signal device affixed to said cable adjacent to each of said fiber optic connectors, at least one electric power connector affixed to said cable, and said cable further including an electrical conductor extending between and connected to said power connector and said visual signal devices whereby said visual signal devices may be activated by connecting an electrical power source through said electric power connector.

19. A fiber optic jumper cable which includes at least one fiber optic light guide for conducting a light signal through said cable, a plurality of fiber optic connectors spaced from one another along said cable for effecting light-signal transmissive interconnections between said light guide and other optic devices, an electrically activatable visual signal device affixed to said cable adjacent to each of said fiber optic connectors, an electrical power connector affixed to said cable adjacent each of said fiber optic connectors, and said cable further including an electrical conductor extending between and connected to each of said power connectors and said visual signal devices whereby each of said visual signal devices may be activated by connecting an electrical power source through any of said electric power connectors.

20. The invention as in claim 18 and wherein said fiber optic connectors include a fiber optic connector on each end of said cable.

21. The invention as in claim 18 in combination with a portable electric battery pack having a mating connector compatible with said electric power connector.

22. The invention as in claim 18 wherein said electric power connector is a switch.

23. The invention as in claim 18 wherein said electrical conductor is embedded in said cable.

24. The invention as in claim 23 wherein each of said visual signal devices is a light emitting device.

25. The invention as in claim 18 wherein each of said visual signal devices is a light emitting diode.

26. A method of tracing fiber optic jumper cables comprising the steps of providing a fiber optic cable with electrically activated telltales at spaced positions therealong and an electrical conductor interconnecting said telltales, selectively applying electrical power to said electrical conductor appropriate to activate said telltales, and observing said activated telltales to determine the location of the respective portions of said cable.

27. The invention as in claim 26 which includes providing fiber optic connectors at each of a plurality of said positions along said cable, disposing said telltales adjacent said fiber optic connectors, and observing said activated telltales to determine the location of said fiber optic connectors.

28. The invention as in claim 27 and including communicating telephonically over said electrical conductor.

* * * * *

UNITED STATES PATENT AND TRADEMARK OFFICE
CERTIFICATE OF CORRECTION

PATENT NO.   :   5,666,453
DATED        :   September 9, 1997
INVENTOR(S)  :   Dannenmann John E.

It is certified that error appears in the above-identified patent and that said Letters Patent is hereby corrected as shown below:

Column 3, line 39, "wires 2 are embedded" should read --wires 26 are embedded--;

Column 4, line 65, "operated to 'on' an 'off' modes" should read --operated to "on" and "off" modes--;

Signed and Sealed this

Tenth Day of February, 1998

Attest:

BRUCE LEHMAN

Attesting Officer

Commissioner of Patents and Trademarks